(12) United States Patent
Dupeux et al.

(10) Patent No.: US 10,018,795 B2
(45) Date of Patent: Jul. 10, 2018

(54) PLUG FOR CONNECTION TO A SOCKET OF A PANEL OF AN ELECTRONIC EQUIPMENT HOUSING HAVING ANTI-BREAKAGE MEANS FOR THE OPTICAL CABLE ON WHICH THE PLUG IS MOUNTED

(71) Applicant: RADIALL, Aubervilliers (FR)

(72) Inventors: Benoit Dupeux, Vatilieu (FR); Fabien Bourgeas, Saint Nicolas de Macherin (FR); Dominique Lomuscio, Sillans (FR)

(73) Assignee: RADIALL, Aubervilliers (FR)

( * ) Notice: Subject to any disclaimer, the term of this patent is extended or adjusted under 35 U.S.C. 154(b) by 0 days.

(21) Appl. No.: 15/644,631

(22) Filed: Jul. 7, 2017

(65) Prior Publication Data
US 2018/0011268 A1   Jan. 11, 2018

(30) Foreign Application Priority Data

Jul. 7, 2016   (FR) ...................................... 16 56520

(51) Int. Cl.
*G02B 6/36* (2006.01)
*G02B 6/42* (2006.01)
(Continued)

(52) U.S. Cl.
CPC ......... *G02B 6/4292* (2013.01); *G02B 6/3893* (2013.01); *G02B 6/4278* (2013.01);
(Continued)

(58) Field of Classification Search
CPC .............................. G02B 6/4278; G02B 6/4261
See application file for complete search history.

(56) References Cited

U.S. PATENT DOCUMENTS

| 7,077,686 B2 * | 7/2006 | Seo ...................... G02B 6/4292 |
| | | 439/372 |
| 8,113,723 B2 * | 2/2012 | Togami ................ G02B 6/4246 |
| | | 385/53 |

(Continued)

FOREIGN PATENT DOCUMENTS

| WO | 2009-100796 A1 | 8/2009 |
| WO | 2012-101569 A1 | 8/2012 |

OTHER PUBLICATIONS

Mar. 3, 2017 Search Report issued in French Patent Application No. 1656520.

*Primary Examiner* — Rhonda Peace
(74) *Attorney, Agent, or Firm* — Oliff PLC

(57) ABSTRACT

A plug mounted on an optical cable with one or more optical contacts each one having a tab which is deformable elastically or mounted so as to pivot relative to the rest of the contact, including: a body including a front part and a rear part; a bushing fitted around the front part with axial sliding forward, the bushing bearing a tab with an appendage extending inside the rear part, the tab of the bushing and the tab of each contact being disposed relative to each other so that when a traction force is applied to make the bushing slide around the front part, the appendage is able to bear against the tab of each contact so as to deform it elastically or make it pivot until the disconnection is produced between the contact and the converter.

5 Claims, 3 Drawing Sheets

(51) Int. Cl.
*G02B 6/38* (2006.01)
*H01R 13/52* (2006.01)
*H01R 13/53* (2006.01)

(52) U.S. Cl.
CPC ....... *G02B 6/4284* (2013.01); *H01R 13/5219* (2013.01); *H01R 13/53* (2013.01)

(56) References Cited

U.S. PATENT DOCUMENTS

| | | | |
|---|---|---|---|
| 8,708,577 B2* | 4/2014 | Chan | G02B 6/3897 385/139 |
| 9,122,020 B2* | 9/2015 | Haley | G02B 6/3825 |
| 9,523,828 B2* | 12/2016 | Ishii | G02B 6/4246 |
| 2004/0240801 A1 | 12/2004 | Malagrino et al. | |
| 2005/0018979 A1 | 1/2005 | Mizue et al. | |
| 2017/0212315 A1* | 7/2017 | Kurashima | G02B 6/3887 |
| 2018/0011268 A1* | 1/2018 | Dupeux | G02B 6/3893 |
| 2018/0013232 A1* | 1/2018 | Bourgeas | H01R 9/2491 |
| 2018/0013235 A1* | 1/2018 | Dupeux | H01R 13/6315 |

* cited by examiner

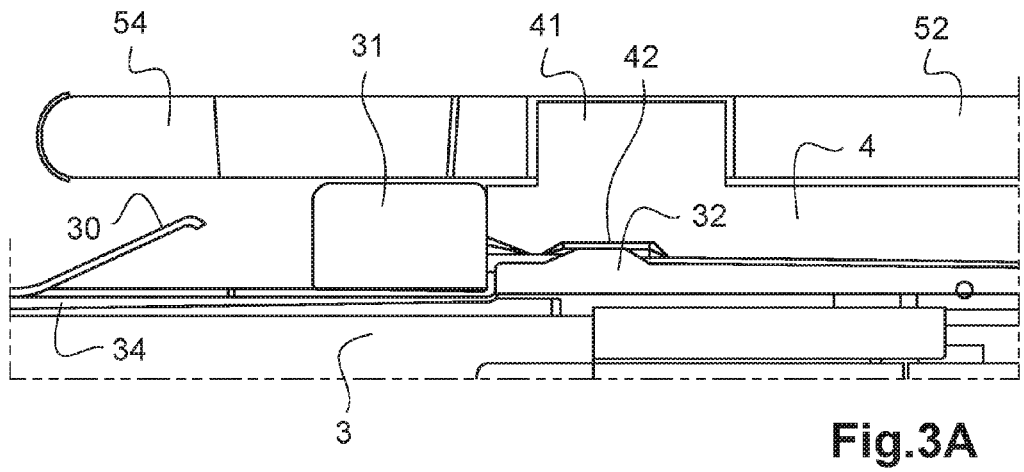
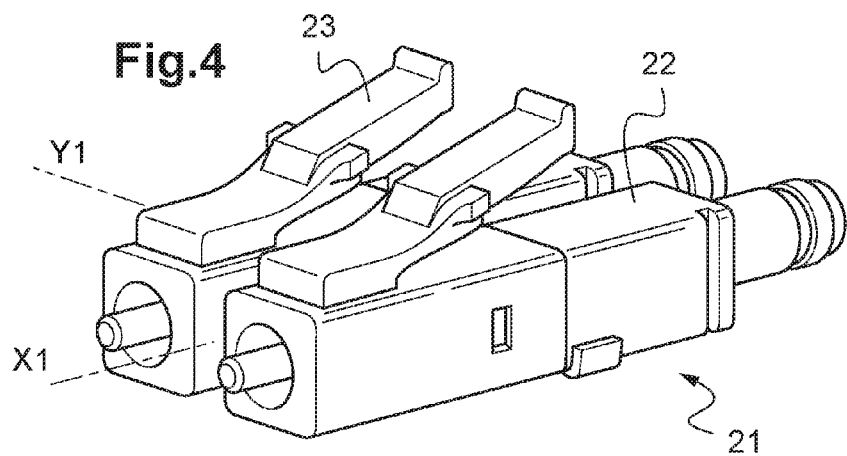
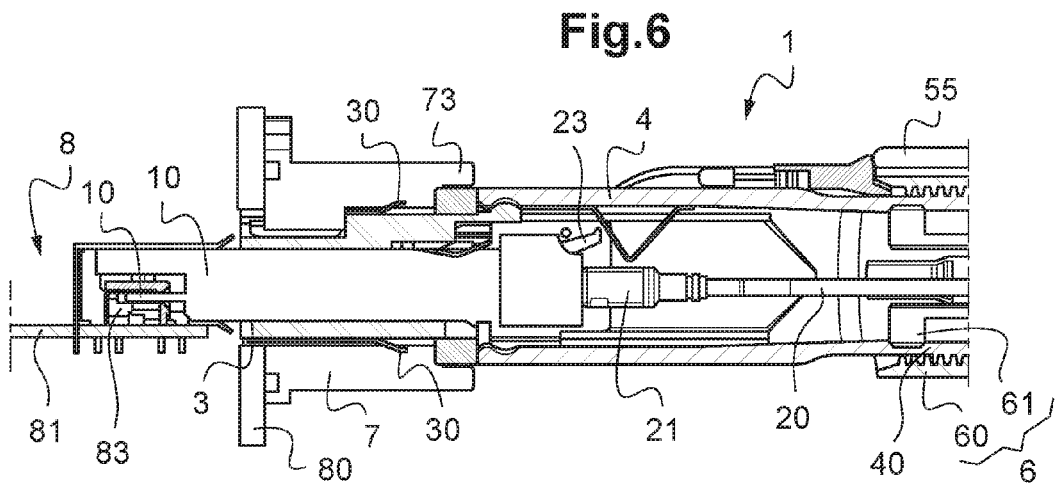

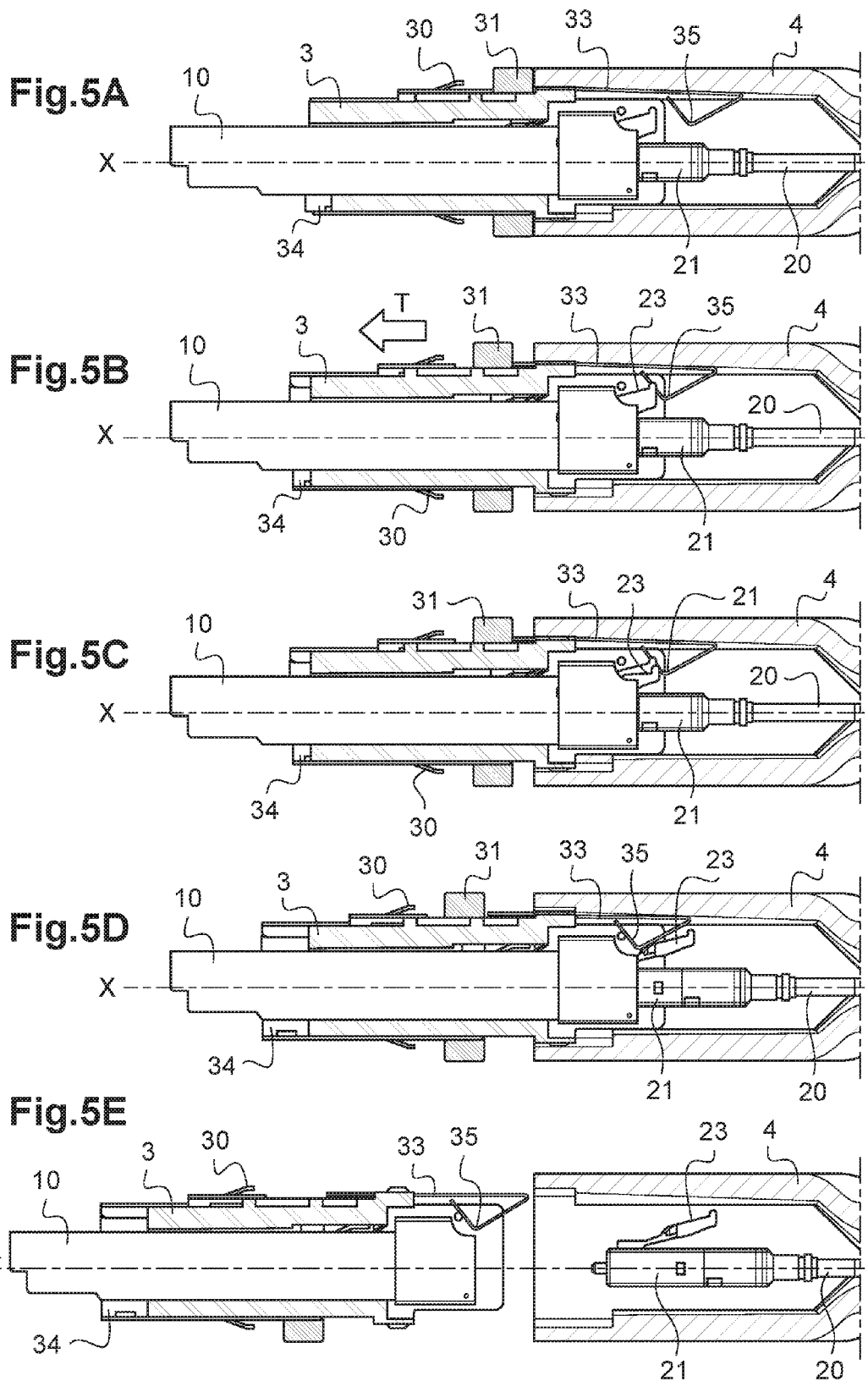

PLUG FOR CONNECTION TO A SOCKET OF A PANEL OF AN ELECTRONIC EQUIPMENT HOUSING HAVING ANTI-BREAKAGE MEANS FOR THE OPTICAL CABLE ON WHICH THE PLUG IS MOUNTED

TECHNICAL FIELD

The present invention concerns a plug designed to be mounted on an optical cable comprising at least one optical conductor having one or more contacts, and to be connected to a panel socket of an electronic equipment housing.

The invention applies in particular to the plugs for connection to the socket of electronic equipment which implement several optical pathways with connections which are found outdoors and/or in harsh conditions particularly in telecommunications installations such as mobile telephone antenna relays, in high-speed data transmission networks for households or industry, in surveillance camera networks or for data transmission in railway installations.

PRIOR ART

It is known how to use optical pathway plugs having an optoelectronic converter of SFP or SFP+ type for example, also called transceivers. In the known plugs, the optoelectronic converter is usually borne by a socket attached to a panel of the electronic equipment housing, one printed circuit card of which supports the optoelectronic converter, as described for example in the patent application WO 2009/100796.

This arrangement of the optoelectronic converter inside the socket presents several drawbacks.

First of all, the dissipation of heat generated in the optoelectronic converter may not be satisfactory.

Moreover, one outlet of the optoelectronic converter is designed to be connected to one or more optical contacts carried by a plug. The connection between optical contacts and the optoelectronic converter might not be easy.

Furthermore, the integration of the optoelectronic converter in the socket makes manual access to the unlocking device of the optical contacts of the plug more difficult. It may then prove necessary to resort to a device able to synchronize the unlocking of the optical contacts and the unlocking of the plug.

Moreover, with a socket having an integrated optoelectronic converter it may prove difficult to achieve a satisfactory alignment between the electrical interface of the plug and that of the socket, despite the tolerances provided by the manufacturers.

It may also prove difficult to adapt a socket with integrated optoelectronic converter to different optical interface standards such as those of optical interfaces using LC or SC contacts.

In order to remedy all of these drawbacks, the applicant proposed in patent application WO 2012/101569 securing in a removable manner at least one optoelectronic converter inside the plug body, one part of the converter projecting to the front of the body.

While this solution is satisfactory overall, the inventors have discovered that there still exists in such an optical plug a risk of breakage of the optical conductor(s).

In fact, without having taken the previous precaution of having physical access to the optical contacts connected to the optoelectronic converter, a user may exert an unwanted traction on the optical cable and/or on the converter in order to separate the latter from the plug body. The traction force is passed on to the optical conductor(s) bearing the optical contact(s), and since the connection between the latter and the converter is mechanically robust, the optical conductor(s) might then be broken.

Thus, there is a need to improve the design of a plug designed to be connected to a socket of an electronic equipment housing so as to remedy some or all of the drawbacks of the prior art as mentioned above, especially in order to prevent any risk of breakage of the conductor(s) of the optical cable on which the plug is mounted.

The purpose of the invention is to meet this need at least in part.

DISCLOSURE OF THE INVENTION

To accomplish this, the invention concerns a plug, designed to be mounted on at least one optical cable, whose one end bears one or more optical contacts each one having a tab which is deformable elastically or mounted so as to pivot relative to the rest of the contact, comprising:

a body having:
  a front part extending along a longitudinal axis (X), the front part being designed to fit into a socket, the front part being adapted to hold and support at least one optoelectronic converter connected to the contact(s) of the cable;
  a rear part forming a sheath, designed to receive the end of the cable itself bearing the contact(s) which is (are) connected in removable manner to the optoelectronic converter(s);
a bushing fitted around the front part of the body with possibility of axial sliding along the (X) axis toward the front of the plug, the bushing bearing a tab with an appendage extending inside the rear part, the tab of the bushing and the tab of each contact being disposed relative to each other so that when a traction force is applied to make the bushing slide around the front part, the appendage of the tab of the bushing is able to bear against the tab of each contact so as to deform it elastically or make it pivot until the disconnection is produced between said contact and the optoelectronic converter(s).

According to one advantageous embodiment, the rear part is mounted floating about the front part of the plug body.

Thanks to the invention, an automatic disconnection between optical contact(s) lodged in the rear part and optoelectronic converter in the front part is easily assured, by a simple traction force exerted on the bushing, and without risk of breaking the optical conductor or conductors, such as optical fibers, of the optical cable on which the rear part of the plug body is mounted.

The floating mounting of the front part on the rear part of the plug body furthermore allows this front part to remain off axis in the socket cavity, even if the rear part of the body itself tends to realign itself with said cavity, especially during a locking of the plug on the socket.

A subsequent advantage due to the floating mounting between front part and rear part of the plug body is that any mechanical stresses applied to the rear part of the plug are not transmitted to the front part and thus to the electronic component mounted on the electronic equipment card. This is advantageous, since such a component is particularly vulnerable to the mechanical forces to which it is submitted by virtue of being held by soldering on the surface of the printed circuit of the card, which is not able to withstand major forces.

According to one advantageous embodiment, the front part and the bushing are made of electrically conductive material, the bushing bearing a plurality of flexible tabs distributed on the periphery of the bushing, the flexible tabs ensuring the electrical contact between the housing of the optoelectronic converter and the inner wall of the socket.

The flexible contact tabs on the perimeter of the front part of the plug body have a sufficient flexure travel so that the mechanical and thus the electrical contact is assured with the inner wall of the socket cavity, even in the event of maximum misalignment. One may furthermore provide a substantial play between the inner wall of the socket cavity and the periphery of the front part of the plug body, which means that the latter might be off centre when lodged in the socket cavity. The front part of the plug body may be recentred with respect to the electronic component with which it needs to be connected thanks to a series of bevels which recentre it as it advances into the socket cavity.

Being conductive, the flexible tabs ensure a perfect electrical continuity. The bushing carrying the flexible tabs may be made of metal, such as aluminium or zamak, moulded under pressure and coated with an anticorrosion protection, or made of plastic with metallization. It may also be machined or made by an additive fabrication technology.

According to another advantageous embodiment, the bushing carries a seal adapted to produce tightness at the interface between the plug and the socket in which the front part of the plug body is designed to be seated. With such a seal, a perfect tightness is provided at the interface between plug and socket. Moreover, the locking force of the plug on the socket may be transmitted efficiently and uniformly to the seal so as to compress it. The seal is preferably carried by the front part and may be made of silicone, MDPE, or any other polymer meeting the requirements of tightness.

The invention likewise concerns a method of disconnection between the front part and the rear part of the body of a plug as previously described, involving a step of axial sliding of the bushing toward the front of the plug until it presses the appendage of the bushing tab against the optical contacts tab(s) and then causes the elastic deformation or pivoting of the latter in order to achieve the disconnection between said contact(s) and the optoelectronic converter(s).

The invention thus prevents any traction on the optical fiber bearing the optical contact(s) which might result in their breaking. In fact, with the plugs according to the prior art if a user tries to dismantle the converter from the rest of the plug without having first loosened the packing gland, the optical fiber may break. With the plug according to the invention, in such a situation if the user pulls on the front part there occurs an automatic disconnection of the optical contacts of the optoelectronic converter, and thus an immediate relaxation of any traction stress harmful to the optical fiber.

DETAILED DESCRIPTION

Other advantages and characteristics of the invention will emerge better upon perusal of the detailed description of exemplary embodiments of the invention provided as an illustration and without limitation, making reference to the following figures, among which:

FIG. 3A is a detail top view of the plug according to one of FIGS. 1 to 3 showing the floating mounting of the front part of the plug body around its front part;

FIG. 4 is a perspective view of one example of optical contacts, of LC type, meant to be connected to an optoelectronic converter of the optical plug according to the invention;

FIGS. 5A to 5E show in longitudinal section view the different steps in the dismounting of the front part of the body of an optical plug according to the invention from its rear part, this dismounting enabling an automatic disconnection between optoelectronic converter held in the front part and the optical contacts seated and held in the rear part;

FIG. 6 is a partial longitudinal section view of a plug according to FIGS. 1 to 3A in connected configuration and locked to a socket of an electronic equipment panel, the optoelectronic converter of the plug being connected to the contact of the electronic component mounted on the surface of a printed circuit card of the electronic equipment.

Figure 1:
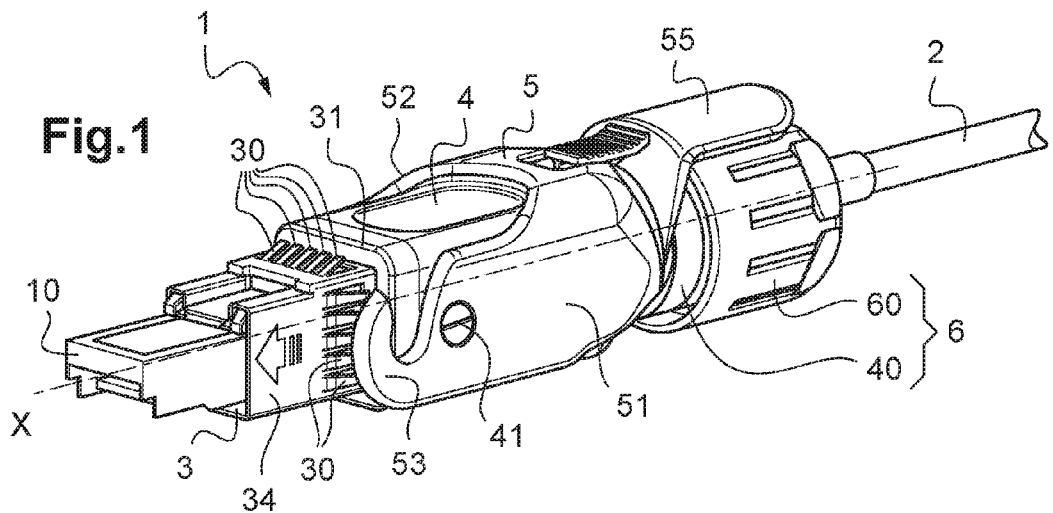
FIG. 1 is a perspective view of an optical plug according to the invention, the plug integrating an optoelectronic converter of "SFP transceiver" type, protruding toward the front of the plug.

It shall be stipulated that the terms "front" and "rear" refer to a plug according to the invention in its configuration mounted on an optical cable. Thus, the front part of the plug body is the one situated on the side with its free end, while the rear part is the one situated on the side by which the optical cable is lodged and held in the plug.

There is shown in FIGS. 1 to 3A an optical plug denoted overall by the reference 1 according to a first exemplary embodiment of the invention.

This optical plug 1 is meant to be connected to a socket 7 which is a single piece with a panel 80 of an electronic equipment housing 8 designed to receive a plurality of optical, electric and power signals or any combination of these signals.

This plug 1 may be designed to be mounted on a single optical cable 2 which may comprise only optical conductors 20.

Each free end of an optical conductor 20 of the cable 2, particularly an optical fiber, carries an optical contact 21.

The plug 1 has a body which extends along a rectilinear longitudinal axis X.

As described and claimed in the French patent application filed under the number FR 16 56518 in the name of the applicant and entitled "Plug for connection to a socket of an electronic equipment housing panel equipped with self-aligning means", the plug body 1 is made of two pieces 3, 4, one making up the front part 3 and the other the rear part 4.

An optoelectronic converter 10, also called a transceiver, may be secured in removable and interchangeable manner inside a seat of the front part 3 of the body which is provided for this purpose. The transceiver 10 protrudes beyond the front part 3 of the plug body.

In the example illustrated, the optoelectronic converter 10 is in contact with the front part 3 of the plug body 1, such that the housing of this optoelectronic converter 10 is at the same electrical potential as this front part 3.

The optical contact(s) 21 may be connected at one end to an optical conductor 20, and connected at their other end to an input of the transceiver 10. The optical contacts 21 are, for example, contacts of LC type and the optoelectronic converter 10 is for example a transceiver of SFP type.

As represented in FIG. 4, each optical contact 21 may comprise at least one tab 23 housed on its upper surface 22, the tab 23 being deformable elastically about an axis Y1 perpendicular to the longitudinal axis X1 of the contact. A pushing on this tab 23 produces its elastic deformation orthogonally to the plane X1-Y1, which makes it possible to release the optical contact 21 from a complementary connection element, especially an optoelectronic converter, to which it is connected. In the configuration lodged inside the rear part 4 of the plug body and connected to the optoelectronic converter 10, the axis X1 of the optical contact 21 coincides with the longitudinal axis X of the plug body.

In the example illustrated in FIGS. 1 to 3A, two identical optical contacts of LC type are each connected on the one hand to an optical conductor 20 of the optical cable 2 and on the other hand to the optoelectronic converter 10.

The front part 3 of the plug body may be made for example of moulded aluminium or pressure-moulded zamak, coated with an anticorrosion protection, or made of plastic, with metallization.

According to the invention, a bushing 34 of electrical conductor material is fitted around the front part 3 of the body, with the possibility of an axial sliding on this front part 3.

This bushing 34 bears a tab 33 with an appendage 35. The tab 33 for a major portion of its length hugs the interior wall of the rear part 4, and its appendage 35 is oriented toward the inside of the rear part 4. In the area of a curved portion of the tab 33 forming the appendage 5, one may provide a pad or even a simple inclined plane integrated with the tab 33.

The bushing 34 further carries a plurality of flexible tabs 30 made of electrical conductor material, distributed over the outer periphery of the front part 3 of the body.

These flexible tabs 30 are adapted to remain in mechanical contact with the interior of the socket 7 when the front part 3 of the body is lodged therein.

A seal 31 may advantageously be integrated with the front part 3. This seal 31 makes it possible to produce the tightness at the interface between the plug 1 and the socket 7 in which the front part of the plug body is meant to be seated during the connection.

As for the rear part 4, this forms a sheath, designed to lodge the end of the optical conductors 20 of the cable 2 which itself carries the contacts 21.

The rear part 4 may be made of plastic material, for example.

The rear part 4 is mounted floating about the front part 3. One advantageous variant for making such a floating mount can be seen in FIG. 3A: two protrusions 32 distributed on either side of the front part 3 are each mounted with a free adjustment in a groove 42 devised for this purpose on one side of the rear part 4 along which a locking hook 53, 54 may pivot.

With the floating mount between front part 3 and rear part 4 of the plug body 1, the front part 3 can remain off axis in the socket cavity 7 even if the rear part 4 of the body tends to realign itself with the latter, especially during a locking by means of a lever 5 as explained below.

Moreover, the presence of the flexible tabs 30 ensures without fail the continuity of contact between front part 3 and socket 7, even in the event of maximum misalignment between the front part 3 and the electronic component 81 carried by the electronic card 82 of the electronic equipment 8 to which the plug 1 is connected.

Figure 2:
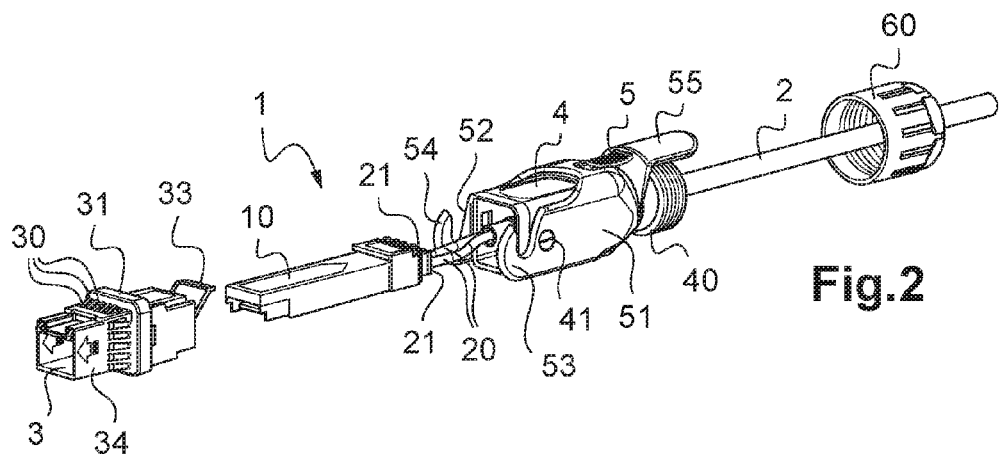
FIG. 2 is an exploded view of the plug according to FIG. 1.
Figure 3:
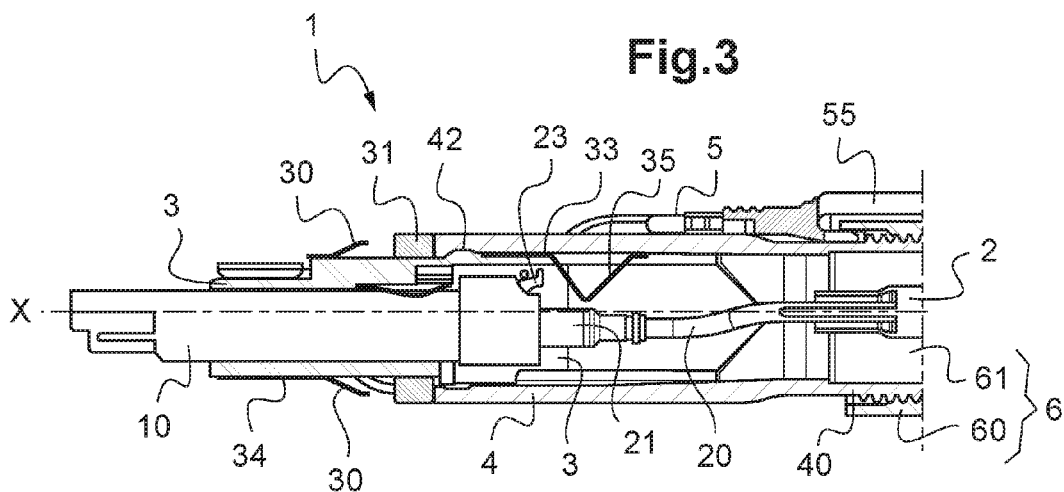
FIG. 3 is a partial longitudinal section view of the plug according to FIGS. 1 and 2.

As illustrated in FIGS. 1 to 3, a locking lever 5 with two arms 51, 52 is mounted pivoting about an axis 41 on the rear part 4 of the plug body. The pivoting axis 41 may be moulded as a single piece with the rear part 41.

The free end of each arm 51, 52 comprises a locking hook 53, 54.

The lever 5 may be configured with a gripping part 55 which allows in easy fashion a manual pivoting of the lever 5 about the axis 41.

The plug 1 once again in the example described comprises a packing gland 6 for retention of the cable 2. The packing gland comprises a nut 60, such as one made of plastic, designed to screw onto the rear part 4 of the plug body 2.

In the example illustrated, the nut 60 comprises an inner thread designed to be screwed around the exterior thread of the rear end 40 of the rear part 4 of the plug body 1, the screwing bringing about the compression of a seal 61 arranged around the cable 2.

We shall now describe, making reference to FIGS. 5A to 5E, the operations of disconnection between front part 3 and rear part 4 of the plug body 1, enabling an automatic disconnection between optoelectronic converter 10 and optical contacts 21.

FIG. 5A shows the assembled configuration of the plug 1: the rear part 4 is mounted floating about the front part 3 of the plug body. The optical contacts 21 are connected to the optoelectronic converter 10 which protrudes beyond the front part 3.

The bushing 34 is mounted sliding around the front part 3 with the seal 31 bearing against the front end of the rear part 3 of the plug body.

The tabs 23 of the optical contacts 21 are not mechanically stressed and they extend upward into the interior of the rear part 4.

Neither is the tab 33 of the bushing 34 mechanically stressed and it extends into the interior of the rear part 4. More precisely, a major portion of the length of the tab 33 hugs the inner wall of the rear part 4, and the appendage 35 at the free end of the tab 33 is oriented toward the interior of the rear part 4.

In order to dismount the front part 3 from the rear part 4 of the plug body, a user exerts a traction force on the bushing 34 to make it slide onto the front part 3 (arrow T in FIG. 5B). In the beginning, this sliding will thrust the appendage 35 of the tab 33 against the tab 23 of each contact 21 (FIG. 5B).

When the user continues to make the bushing 34 slide around the front part 3, the appendage 35 of the tab 33 continues to push on the tab 23 of each contact 21 and thus cause its bending (FIG. 5C) and thus its pivoting until the disconnection occurs between said contact 21 and the optoelectronic converter 10 (FIG. 5D).

Once this disconnection has been accomplished, the front part 3 with the bushing 3 around it is separated from the rear part 4 of the plug body 1 (FIG. 5E). FIG. 6 illustrates the plug 1 of the invention according to FIGS. 1 to 3 in a configuration of connection and locking to a socket 7 of a panel 80 of electronic equipment 8 whose electronic component 83 with contacts 82 connected to the converter 10 is carried by the printed card 84.

In this FIG. 6, one sees moreover that the socket comprises lips 73 which mechanically protect the seal 31 well. Thus, it is less exposed directly to UV light and to the weather.

The plugs according to the invention and the sockets to which they may be connected may be configured to operate at temperatures between −40° C. and +125° C.

In terms of tightness, the plugs according to the invention and/or the sockets may satisfy the standards IP65, IP 67, IP68 or UL50E.

The plug 1 according to the invention which has just been described may receive and hold in its front part 3 any given known connector.

Other variants and advantages of the invention may be achieved without thereby leaving the scope of the invention.

Thus, if in the embodiments illustrated the optical contacts 21 are provided with elastically deformable tabs 23 whose function is to allow their disconnection when they are connected to the optoelectronic converter 10, the invention may also be implemented with optical contacts 21 with one tab 23 for each, mounted to pivot about the rest of the contact 21 about the axis Y1.

The invention is not limited to the examples just described; in particular, one may combine the characteristics of the examples illustrated within variants which have not been illustrated.

The invention claimed is:

1. Plug, designed to be mounted on at least one optical cable, whose one end bears one or more optical contacts, each one having a tab which is deformable elastically or mounted so as to pivot relative to the rest of the contact, comprising:
   a body having:
      a front part extending along a longitudinal axis (X), the front part being designed to fit into a socket, the front part being adapted to hold and support at least one optoelectronic converter connected to the contact(s) of the cable;
      a rear part forming a sheath, designed to receive the end of the cable itself bearing the contact(s) which is (are) connected in removable manner to the optoelectronic converter(s);
      a bushing fitted around the front part of the body with possibility of axial sliding along the (X) axis toward the front of the plug, the bushing bearing a tab with an appendage extending inside the rear part, the tab of the bushing and the tab of each contact being disposed relative to each other so that when a traction force is applied to make the bushing slide around the front part, the appendage of the tab of the bushing is able to bear against the tab of each contact so as to deform it elastically or make it pivot until the disconnection is produced between the contact and the optoelectronic converter(s).

2. Plug according to claim 1, wherein the rear part is mounted floating about the front part of the plug body.

3. Plug according to claim 1, wherein the front part and the bushing are made of electrically conductive material, the bushing bearing a plurality of flexible tabs distributed on the periphery of the bushing, the flexible tabs ensuring the electrical contact between the housing of the optoelectronic converter and the inner wall of the socket.

4. Plug according to claim 1, wherein the bushing carries a seal adapted to produce tightness at the interface between the plug and the socket in which the front part of the plug body is designed to be seated.

5. Method of disconnection between the front part and the rear part of the body of a plug according to claim 1, involving a step of axial sliding of the bushing toward the front of the plug until it presses the appendage of the bushing tab against the optical contacts tab(s) and then causes the elastic deformation or pivoting of the latter in order to achieve the disconnection between the contact(s) and the optoelectronic converter(s).

* * * * *